United States Patent
Li et al.

(10) Patent No.: US 10,451,862 B2
(45) Date of Patent: Oct. 22, 2019

(54) CALIBRATION PLATE FOR MEASURING CALIBRATION OF A DIGITAL MICROSCOPE AND METHODS OF USING THE SAME

(71) Applicant: Carl Zeiss Microscopy GmbH, Jena (DE)

(72) Inventors: Zhongyu Li, Shanghai (CN); Patrick Nagel, Reutlingen (DE); Hailei Gu, Shanghai (CN)

(73) Assignee: Carl Zeiss Microscopy GmbH, Jena (DE)

( * ) Notice: Subject to any disclaimer, the term of this patent is extended or adjusted under 35 U.S.C. 154(b) by 1312 days.

(21) Appl. No.: 14/230,803

(22) Filed: Mar. 31, 2014

(65) Prior Publication Data

US 2015/0248003 A1 Sep. 3, 2015

(30) Foreign Application Priority Data

Mar. 3, 2014 (CN) .......................... 2014 1 0074532

(51) Int. Cl.
  *H04N 9/47* (2006.01)
  *G02B 21/36* (2006.01)
(52) U.S. Cl.
  CPC .................................... *G02B 21/36* (2013.01)
(58) Field of Classification Search
  CPC ........ G02B 21/36; B82Y 10/00; B82Y 40/00; G03F 7/0002; G03F 7/2012; G01B 3/02; G06T 7/0018; G01L 1/24; G01Q 40/02
  USPC ............. 348/80, 79, 140; 430/306; 424/489, 424/501; 428/220; 345/419; 250/201.3; 125/13.01
  See application file for complete search history.

(56) References Cited

U.S. PATENT DOCUMENTS

| | | | | |
|---|---|---|---|---|
| 4,557,599 A * | 12/1985 | Zimring | ................... | G01B 3/02 125/13.01 |
| 5,117,110 A * | 5/1992 | Yasutake | ................ | G01Q 40/02 250/491.1 |
| 6,431,007 B1 * | 8/2002 | Roy | .......................... | G01L 1/24 73/800 |
| 8,913,127 B2 * | 12/2014 | Kotchou | ............... | G06T 7/0018 348/140 |
| 2003/0071191 A1 * | 4/2003 | Nikitin | ................. | G02B 21/002 250/201.3 |

(Continued)

FOREIGN PATENT DOCUMENTS

JP 2004078162 A 3/2004

OTHER PUBLICATIONS

Postek, M.T., "Critical Issues in Scanning Electron Microscope Metrology," Journal of Research of the National Institute of Standards and Technology, vol. 99, No. 5, Sep.-Oct. 1994 (pp. 641-671).

*Primary Examiner* — Gims S Philippe
(74) *Attorney, Agent, or Firm* — Patterson Thuente Pedersen, P.A.

(57) ABSTRACT

A calibration plate for measuring calibration of digital microscope and methods of using the same. The calibration plate comprises at least one calibration area formed with a surface structure which includes a plurality of grid cells arranged periodically, wherein at least part of boundary and/or at least part of apexes of each grid cell can be identified by an optical imaging system of the digital microscope. The invention also includes a digital microscope system equipped with the calibration plate.

9 Claims, 5 Drawing Sheets

(56) References Cited

U.S. PATENT DOCUMENTS

| | | | |
|---|---|---|---|
| 2005/0220362 A1 | 10/2005 | Nikitin | |
| 2007/0296945 A1* | 12/2007 | Miura | G03B 27/54 355/67 |
| 2008/0012850 A1* | 1/2008 | Keating, III | H04N 13/0207 345/419 |
| 2015/0201117 A1* | 7/2015 | Acher | G01Q 40/00 348/79 |
| 2016/0260218 A1* | 9/2016 | Zweig | G06T 7/80 |

* cited by examiner

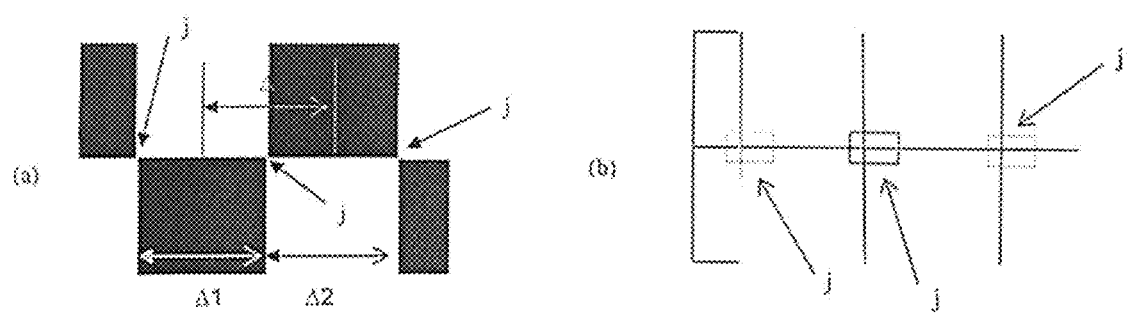
Fig. 3
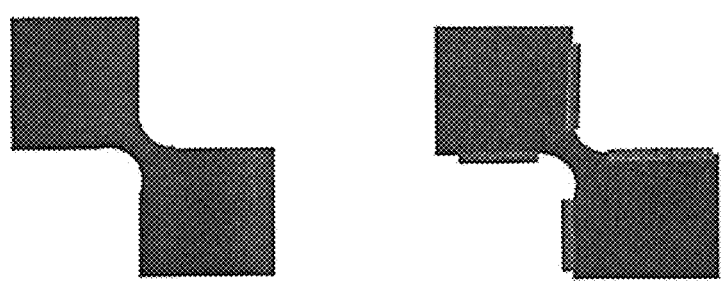
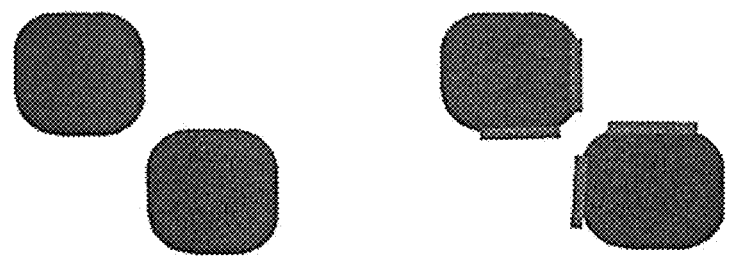
Fig. 4          Fig. 5

CALIBRATION PLATE FOR MEASURING CALIBRATION OF A DIGITAL MICROSCOPE AND METHODS OF USING THE SAME

PRIORITY DATA FOR FOREIGN APPLICATION RELATED TO UTILITY APPLICATION

The present application claims priority from Chinese Application No. 201410074532.X, filed Mar. 3, 2014, which application is incorporated by reference herein in its entirety.

FIELD OF THE INVENTION

The present invention relates to a calibration plate for measuring calibration of a digital microscope, a method for measuring calibration of a digital microscope using the calibration plate and a digital microscope system comprising the calibration plate.

BACKGROUND OF THE INVENTION

In digital microscopes (in this patent application, "digital microscope" includes, without limitation, microscopes in conjunction with an imaging system), a specimen image that has been magnified by an objective lens is magnified and captured by a built-in digital camera, and then is displayed on monitor device. There tends to be a demand for a microscope user to make size measurements directly on displayed images. To this end the following two basic methods may be used.

One way is called theoretical calibration/scaling, in which a total magnification is calculated by multiplying the magnification of the objective (generally engraved in the objective body) by the magnification of the camera adaptor lens and the magnification of the monitor device. The real size of the specimen is derived by dividing the display image size (measured with software) by the total magnification. The drawbacks of this method are: the user needs to know which components are currently installed at the microscope, and needs to know the influence on total magnification of every exchangeable microscope component—and how they interact with each other. Another disadvantage is that theoretic scaling cannot take into account an individual device's production tolerances.

Another way is measuring calibration/scaling, in which the digital microscope software provides a pixel mapping function to measure a pixel distance of the image. To transfer a pixel distance to a real distance on the specimen, the operator needs to measure an object of known size for comparison. Via the reference object, the relationship between pixel distance on the monitor screen and the real distance on specimen itself can be accurately summed and recorded by the microscope software. After that, the calibrated system can be used to measure the specimen of interest. The reference object mentioned above is called a calibration plate. Measuring scaling does not require much knowledge of the user's microscope on the side of the microscopy software. It does require, however, the user to have a reference object of a known real size, which can then be imaged by the microscopy software. The software then measures the pixel distance between two features in that image, and with the help of the user who enters the real (known) distance, mapping is established.

A typical calibration plate most widely used in the market includes a graduated ruler pattern. When the measuring calibration procedure starts, operator places the calibration plate on the microscope stage. Then he/she chooses an objective, focuses and moves the calibration plate until the ruler image appears clearly in the monitor device. Thereafter the operator selects a ruler start and an end point on the monitor, and the software calculates the pixel distance (D_pixel) therebetween. The operator counts the ruler divisions on the monitor, (i.e. the number of intervals between selected start and end point). Since one division distance on the ruler is known, the real distance (D_real) between the selected start and end point can be calculated. The magnification M can be derived by dividing the pixel distance by the real distance (M=D_pixel/D_real) and saved in the microscope software, and thereby the measuring calibration of the chosen objective is completed. Finally the operator may change to other objectives and repeat the above steps until all the objectives are calibrated. The drawbacks of the above measuring calibration by using the ruler are: the calibration process needs too much user intervention (selecting ruler start and end point), and the calibration accuracy depends on user operation. It will impact calibration accuracy if the user measures reference objective wrongly.

As an example of measuring calibration, it is proposed in a reference document (M. T. Postek, Critical Issues in Scanning Electron Microscopes Metrology, Journal Of Research of the National Inst. of Standards & Technol., Vol. 99, No. 5, Oct. 1994, pp. 658-660) to use pitch magnification as a standard for magnification calibration. This provides significant advantages in the precision of a microscope's magnification calibration, as the pitch reference contains several repeatable identical features (lines or stripes). Independently of the type or model of the microscope being calibrated, these patterned lines will appear to be identical to each other. This strongly facilitates evaluation of the pitch value of structures present in the microscope image—specifically, the distance between any equivalent points of adjacent stripe pattern features in the image can be considered as the pitch value. Such points can be established or noted by using the maxima or minima of brightness in the video signal, and any repeated characteristic features in the video signal—slopes, etc. In such a method, the pitch value is obtained on the basis of the signal intensity—maxima and minima of brightness in the image, and is not a precise algorithm based on geometrical features, because the brightness tends to be affected by various errors.

As another example of measuring calibration, it is described in patent application US2005220362 an improved method of precision calibration of a microscope magnification including calculating a magnification scale as a quotient obtained when an image size of a test object viewed or collected with the microscope as divided by a true test object size. The method comprises the steps of obtaining a magnification reference by taking a diffraction grating with a tested pitch value as the test object; distributing a brightness level between 30-70% amplitude in one of an image of the diffraction grating and a video signal obtained in the microscope; calculating a position of the video signal "center of mass" for each of formed "islands" of the brightness distribution; considering an average distance between neighboring "center of mass" as a grating pitch in a microscope image of the object; and recognizing that a magnification scale of the microscope is a result of a division of an average pitch dimension by the true grating pitch. The drawback in this method is that magnification is only calculated in one dimension, and "center of mass" signal is prone to be impacted by error sources. Thus, the accuracy and robustness of the method is limited.

In JP2004078162, a magnification calculation method is disclosed. The principle of the measurement is to let a round object of known size superimpose with circular reticle in front of the eyepiece to determine magnification. This simple method nevertheless has some notable drawbacks: it is not an automatic measuring calibration, is only suitable for a continuous zoom microscope, and has low accuracy.

SUMMARY OF THE INVENTION

In order to overcome one or more of the above drawbacks in the prior art, the objective of the present invention is to provide a calibration plate for measuring calibration of a digital microscope (i.e. "microscope with imaging system"), which allows for automatic, simple, reliable and accurate measuring calibration of the digital microscope.

According to embodiments of the present invention, the calibration plate for measuring calibration of a digital microscope comprises at least one calibration area formed with a surface structure which includes a plurality of grid cells arranged periodically, wherein at least part of boundary and/or at least some of the apexes of each grid cell can be identified by an optical imaging system of the digital microscope.

Advantageously, the plurality of grid cells may be in the shape of a square with equal size, and arranged in a chessboard-like pattern. Embodiments of the present invention further provide a digital microscope system equipped with the calibration plate, and methods for measuring calibration of the digital microscope by using the calibration plate.

BRIEF DESCRIPTION OF THE DRAWINGS

FIG. 3 is an explanatory diagram showing an exemplary method for identification and calculation of a chessboard-like pattern on the calibration plate according to embodiments of the present invention;

FIGS. 4 and 5 are explanatory diagrams showing another exemplary method for identification and calculation of a chessboard-like pattern on the calibration plate according to the present invention;

DETAILED DESCRIPTION OF THE DRAWINGS

Embodiments of a calibration plate, and method of using the same according to embodiments of the present invention, will be described hereinafter with reference to the drawings. The calibration plate will be placed within the objective visual field of a digital microscope for measuring calibration of the latter.

Figure 1:
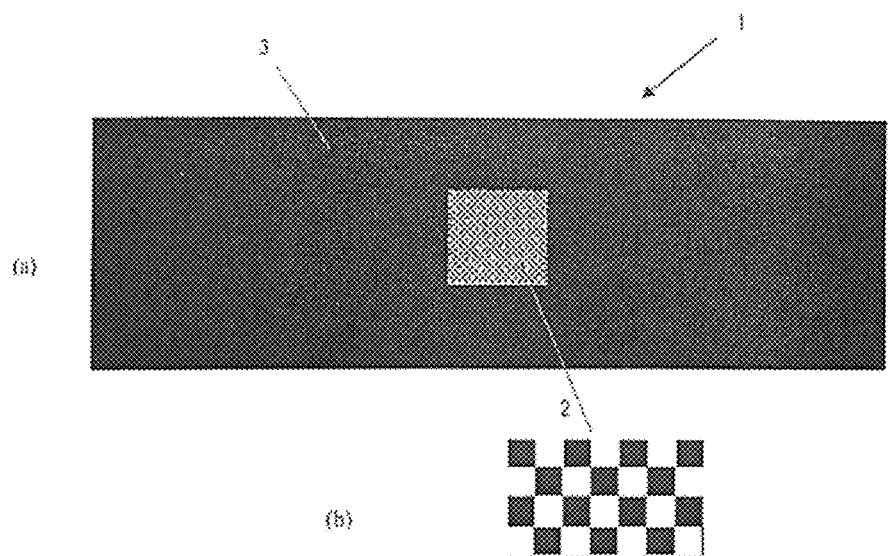
FIG. 1 depicts a first exemplary configuration of a calibration plate according to an embodiment of the present invention.

FIG. 1 shows an exemplary calibration plate 1 having a plate profile of e.g. rectangular shape as shown in FIG. 1(a). The calibration plate 1 may be made of e.g. glass or other suitable materials known in this technical field. The calibration plate 1 includes on e.g. one surface thereof a calibration area 2 formed with a surface structure. FIG. 1(b) is a partially enlarged view of the calibration area 2, as shown therein, the calibration area 2 has a surface structure in a chessboard-like pattern. More specifically, the surface structure includes a plurality of grid cells arranged in a chessboard-like pattern (e.g. the alternating black and white grids in FIG. 1(b)), wherein at least part of the boundary of each grid cell can be identified by the optical imaging system of the digital microscope. Supposing an ideal precision of manufacturing, all the grid cells in the chessboard-like pattern are in the shape of a square with an identical side-length.

In embodiments of the present invention, "at least part of boundary can be identified by the optical imaging system of the digital microscope" may be understood in such a way that the adjoining areas located at opposite sides of the boundary part have an optical property difference notable enough to be identified by the optical imaging system, or that the boundary part itself, relative to the surrounding areas, exhibits an optical property difference notable enough to be identified by the optical imaging system. Here, the "optical property" may typically be the reflection rate, or may include e.g. the difference in color (black versus white, red versus green, blue versus white, etc.).

In the embodiment shown in FIG. 1(b), the grid cells are arranged in a chessboard-like pattern to form the surface structure. However, the present invention is not limited to this, and it would suffice that the plurality of grid cells are periodically arranged. In the context of the present invention, "periodically arranged" means a plurality of grid cells appear at same intervals or contiguous to one another in one-dimensional or two-dimensional direction. Moreover, the grid cells are not limited to the squares of identical size as shown in FIG. 1(b), and may be in various shapes, such as a triangle, quadrilateral (e.g. parallelogram, including rectangle, rhombus, etc.), circle, and so on. Apart from the chessboard-like pattern shown in FIG. 1(b), the plurality of black grid cells as respectively shown in e.g. FIGS. 2(a)-2(d) are also periodically arranged (i.e., grid cells that repeatedly appear at same intervals or contiguous to one another) in a two-dimensional direction. A plurality of grid cells that are periodically arranged in a one-dimensional direction (not shown) resemble a bar code on commodities, in which alternating black and white stripes or stripes of different colors are arranged periodically or at same intervals or with same widths. In such a case, the stripes may also be considered as grid cells since they are line segments with certain widths. Preferably, the grid cells have equal size and identical shape.

The above surface structure can be formed by various methods, for example, including but not limited to, photoetching, printing and so on. In the photoetching method, a coating of metal (such as chromium) can be deposited on a substrate of the calibration plate 1, then a desired pattern can be set by exposure in the coating by using an optical mask, and the final pattern can be formed by subsequent etching. In this case, taking the calibration area 2 in FIG. 1(b) as an example, the black grid cells may represent the surface on which the coating is not etched, while the white parts (also in the form of grid cells) may represent the surface on which the coating has been etched. Thus, the black and white grid cells will have different reflection rates and a change in reflection rate will take place at the boundary of the black grid cell (i.e. the interface of two adjacent black and white grid cells), such that the optical imaging system of the microscope can identify the boundary in the image. In the printing method, the chessboard-like pattern formed by the alternating black and white grid cells shown in FIG. 1(b) can be directly printed on the substrate (e.g. transparent parchment paper) of the calibration plate 1 by using black ink, and the interface of the black and white grid cells can also be identified from the image by the optical imaging system because of reflectivity difference thereof.

Figure 2:
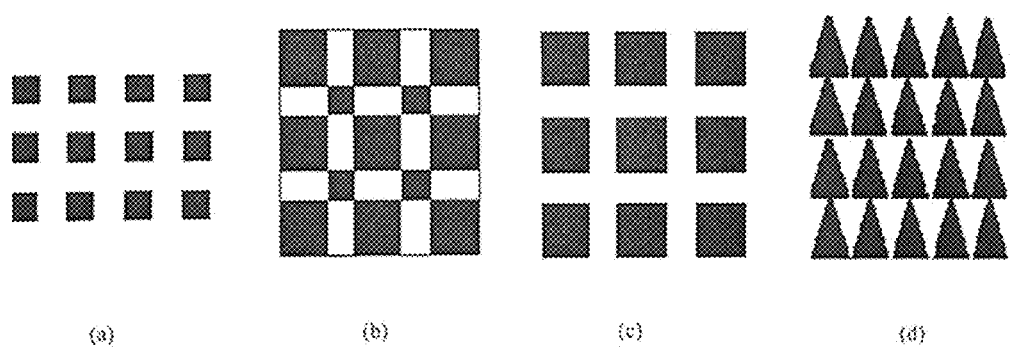
FIG. 2 shows alternative configurations of the calibration plate depicted in FIG. 1.

In addition, in the respective embodiments shown in FIGS. 1 and 2, the whole black grid cell is formed to have a different surface and thus a different reflection rate from the adjoining areas. However, the present invention is not limited to this, and it will suffice that a partial area of the grid cell, which adjoins the boundary part that can be identified by the optical imaging system of the digital microscope, and an external area which adjoins the boundary part, have different reflectivities.

With the above-described calibration plate according to an embodiment of the present invention, at least part of boundary and/or at least part of the apexes of each grid cell in at least one calibration area of the calibration plate can be identified by the optical imaging system of the digital microscope, so that image positions or the relative image position relationship of the identified at least part of boundary and/or of apexes of the grid cells in the digital image can be determined. On the other hand, preset positions or the preset relative position relationship of the at least part of boundary and/or apexes of the grid cells can be preset when the calibration plate is manufactured and thus are known to the digital microscope system. Therefore, the magnification of the digital microscope can be calculated according to the image positions or relative image position relationship and the preset positions or preset relative position relationship of the identified at least part of boundary and/or of apexes of the grid cells, whereby the digital microscope can be calibrated.

More specifically, taking the chessboard pattern shown in FIG. 1(b) as an example, after the interfaces of adjacent black and white grid cells (i.e. the boundaries of the black grid cells) are identified from the image of the calibration area, the junction points of straight lines (horizontal and vertical lines) formed by connecting the boundaries of the grid cells (i.e. the common apexes of grid cells that are adjacent in diagonal direction) can be discovered by computer image processing methods; the above mentioned junction points can be simply referred to herein as "junction points of the grid cells". In this case, the junction points of the grid cells are also apexes of the grid cells. As depicted in FIGS. 2(a) and 2(c), the grid cells do not join to one another, such that the grid cells have respective apexes, instead of junction points. As depicted in FIG. 3, positions of the junction points j among the grid cells in the image can be determined through a differential and edge feature extraction algorithm and are recorded as $G_{image}$, wherein the $G_{image}$ is in the form of a numerical value matrix, with its elements being positions of the junction points j which can be represented by coordinates from an origin. The coordinates may be measured by the real distance in the image or by pixel distance in the image. In addition, the preset positions of the junction points j in the calibration area of the calibration plate are preset or pre-measured during manufacturing and are recorded as a numerical value matrix $G_{real}$. Then, a value M (root-mean-square of ($M*G_{real}-G_{image}$) minimum) is calculated as the magnification of the digital microscope, whereby the measuring calibration thereof is completed.

The differential and edge feature extraction algorithm as shown in FIG. 3 and described above is a method for identification and calculation of the grid cells used in case of relatively ideal manufacturing (with a high precision of manufacturing) of the chessboard-like patterned grid cells in the calibration area. However, in actual conditions, due to limitations in manufacturing precision, the grid cells may be formed as shown in FIG. 4 (i.e. two adjacent grids cells in diagonal direction connected to each other in a curved transition at the apexes thereof), or disconnected from each other to be two grids with curved apexes. This may result in a difficulty in automatic identification of the lateral sides of the grid cells in the digital image by the microscope software. Also, when the calibration plate is placed on a stage of the microscope for calibration, the plate may be rotated relative to an upright condition, and this may affect identification and calculation of the software as well. In this case, another method as shown in FIG. 6 and described below may be used in the present invention to identify the chessboard-like patterned grid cells.

Figure 6:
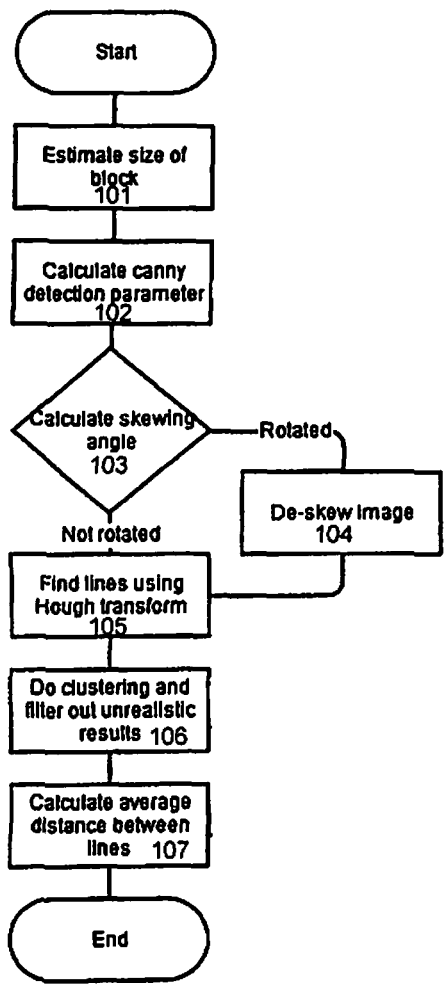
FIG. 6 is a flow chart of another exemplary method for identification and calculation of a chessboard-like pattern on the calibration plate according to the present invention.

As shown in FIG. 6, in step 101, a number of horizontal and vertical straight lines are generated across the grid cells in a chessboard-like pattern. Since the chessboard-like pattern of the calibration plate 1 may be slightly rotated when placed, these straight lines may be only approximately horizontal or vertical in the image. The straight lines are converted into short line segments in the grid cells using a suitable thresholding algorithm, and depending on the black and white grid cells that the straight lines cross. For example, a portion of a straight line across a black grid cell is converted into a black short line segment while a portion across a white grid cell is converted into a white short line segment. Next, an average length of these short line segments is calculated. In other words, in step 101, an approximate value of the size of the grid cells in the chessboard-like pattern is estimated by averaging the short line segments. Such a value is "approximate" because the chessboard-like pattern of the calibration plate 1 may be slightly rotated when placed. The function of the approximate value (average length) will be described below.

Next, in step 102, the edges, which approximate to straight lines, of the grid cells are recognized by, for example a Canny edge detection algorithm as is known in the art, and are marked in the digital image, so as to obtain a plurality of discontinuous short line segments (the edges, which approximate to straight lines, of the grid cells are shown by the short line segments drawn as rectangular in FIG. 5). Specifically, for instance, a Canny edge detection threshold value can be pre-computed by using Otsu's method as is known in the art, or another thresholding algorithm, and then a Canny edge detection on the image can be performed.

Then, in step 103, the line segments obtained in step 102 are processed by using e.g. a Probabilistic Hough Transform algorithm to calculate the possible skewing angle of the digital image. It should be noted that in this step, it is not necessary to process all the line segments because the purpose thereof is merely to calculate the skewing angle.

If the calculation result of step 103 shows that there is a skewing angle of the image, the image is de-skewed in accordance with the calculated skewing angle in step 104 and then the process proceeds to step 105. If there is no skewing angle calculated in step 103, the process proceeds to step 105 directly.

In step 105, the Probabilistic Hough Transform algorithm is used again to find the discontinuous line segments in the de-skewed image. At this time since the image has been de-skewed, the line segments are horizontal or vertical. Then, in step 106, the discontinuous horizontal or vertical line segments are connected to form continuous horizontal or vertical lines by using e.g. any clustering algorithm. Before connection of the discontinuous line segments, optionally, the average length calculated in step 101 may be used as a reference to filter out some line segments that are too long or too short so as to improve precision. It is thus can be known that the step 101 is optional and is not necessary to be as the first step of the process; it may be performed any time before the step 106.

Finally, in step 107, the image positions of the junction points are calculated according to the continuous horizontal and vertical lines obtained in step 106 as the image position matrix $G_{image}$ of the junction points of the grid cells. Then, the magnification M of the microscope can be calculated with the root-mean-square of $(M*G_{rear} - G_{image})$ minimum in conjunction with the preset position matrix $G_{real}$ of the junction points of the grid cells. Alternatively, in step 107, according to the continuous horizontal and vertical lines obtained in step 106, the average distance therebetween can be calculated (the average distance may be e.g. the pixel distance in the digital image, referred to as "average pixel distance"). Then, since the preset length of the lateral side ("preset side-length") of the grid cells in the chessboard-like pattern is known, it is possible to calculate the real distance per pixel in the image by dividing the preset side-length of the grid cell by the average pixel distance, and the magnification M of the digital microscope may also be calculated by dividing the average pixel distance by the preset side-length of the grid cell.

An exemplary configuration of the calibration area of the calibration plate according to the present invention and an exemplary method of using the same are disclosed hereinabove with reference to relevant drawings. The calibration area of the calibration plate of embodiments of the present invention comprises a plurality of grid cells that are periodically arranged, wherein at least part of the boundary of each grid cell can be identified by the optical imaging system of the digital microscope. In other words, a pattern with remarkable features having high contrast and periodically arranged is accurately positioned in the calibration area, which is possible for the software of the microscope to automatically recognize using digital image processing methods. On this basis, the magnification is calculated according to the real size of a number of grid cells visible in the objective visual field, so as to average the manufacturing error in each grid cell and improve calculation accuracy. In addition, since the grid cells are arranged periodically, it is possible to add an error-proofing mechanism to exclude wrong junction points resulting from contamination or scratch of the calibration plate (for example, it is possible to check if two adjacent junction points are equal-distant or if two adjacent junction points have different polarities in the differential and edge feature extraction algorithm), thereby enhancing robustness of the calibration plate in measuring calibration.

Figure 9:
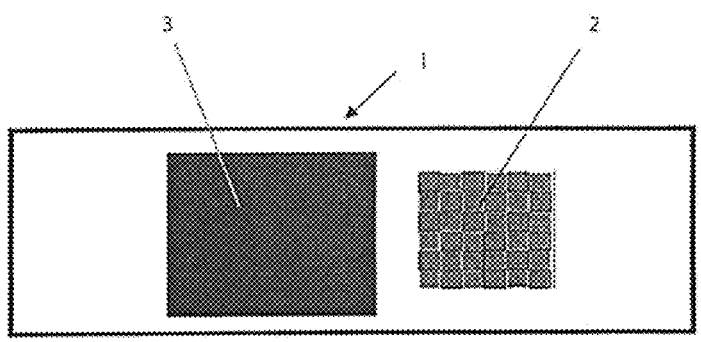
FIG. 9 shows a fourth exemplary configuration of a calibration plate according to an embodiment of the present invention.

As depicted in FIG. 1, in addition to the calibration area 2, the calibration plate 1 according to the present invention may further include an even reflection area 3 which exhibits equal reflection rate for visible lights of all the wavelengths. More specifically, this means that any one location in the even reflection area 3 has equal reflectivity for all wavelengths of visible light, and any two locations in the even reflection area 3 have identical reflectivities for the visible light. Nowadays more and more digital microscopes are equipped with a reflected illumination beam path, which is favorable in inspecting an opaque specimen. The even reflection area 3 can be used for (color) shading correction and white balance correction of the microscope camera in reflected beam, so as to keep the digital microscope in a good condition. The even reflection area 3 may be formed by, for example, a coating on the surface of the calibration plate, which coating may be a layer of metal (e.g. chromium) or an optical reflection coating. In the embodiment of FIG. 1, the even reflection area 3 covers the whole calibration plate surface other than the calibration area 2. However, the present invention is not limited to this. As depicted in FIG. 9, the even reflection area 3 may also be a separate area from the calibration area 2 and may have any suitable size and shape. For instance, the even reflection area 3 may be formed by photoetching. In the calibration plate of embodiments of the present invention, the calibration area 2 and the even reflection area 3 are combined in the same plate to form a multi-use calibration plate for measuring calibration, shade correction and white balance correction functions. That is, with the calibration plate of the present invention, various calibrations/corrections can be achieved, including magnification of the microscope, distortion, color shading and white balance of the camera.

Figure 7:
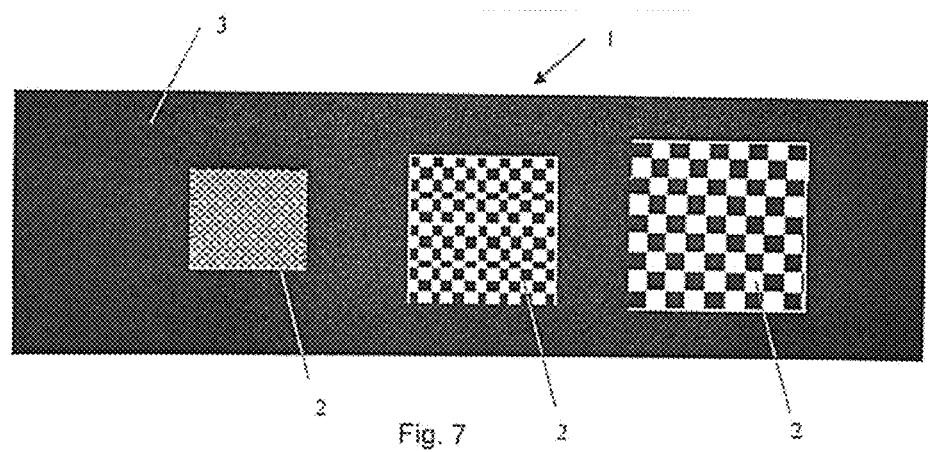
FIG. 7 shows a second exemplary configuration of a calibration plate according to an embodiment of the present invention.

FIG. 7 depicts another exemplary configuration of the calibration plate 1 according to the present invention, which differs from the one shown in FIG. 1 in including a plurality of calibration areas 2, wherein the grid cell of any one calibration area 2 has different size from that of other calibration areas 2. Typically, a microscope has several objectives and a magnification range that could be very large. For example, a routine microscope has a magnification from 4×~100×. In that case, the cell size of the grid cells in the calibration plate needs to be adaptable to a quite large range of magnification of the microscope. Otherwise in the objective visual field there could be too few grid cells in case of large magnification such that the calculation accuracy might not be sufficient, or too many grid cells in case of small magnification such that the calculation is voluminous and time-consuming. The above drawbacks can be avoided by using the calibration plate depicted in FIG. 7. Specifically, the calibration plate is movable rightward and leftward during measuring calibration to select one from the plurality of calibration areas to be placed within the objective visual field. The number of the grid cells appearing in the objective visual field of this selected calibration area is within a predetermined range (i.e. too many or too few grid cells in the objective visual field are avoided). When it changes to another objective lens with a larger or smaller magnification for calibration, the calibration plate may again be moved accordingly to select another calibration area having larger or smaller grid cells.

Figure 8:
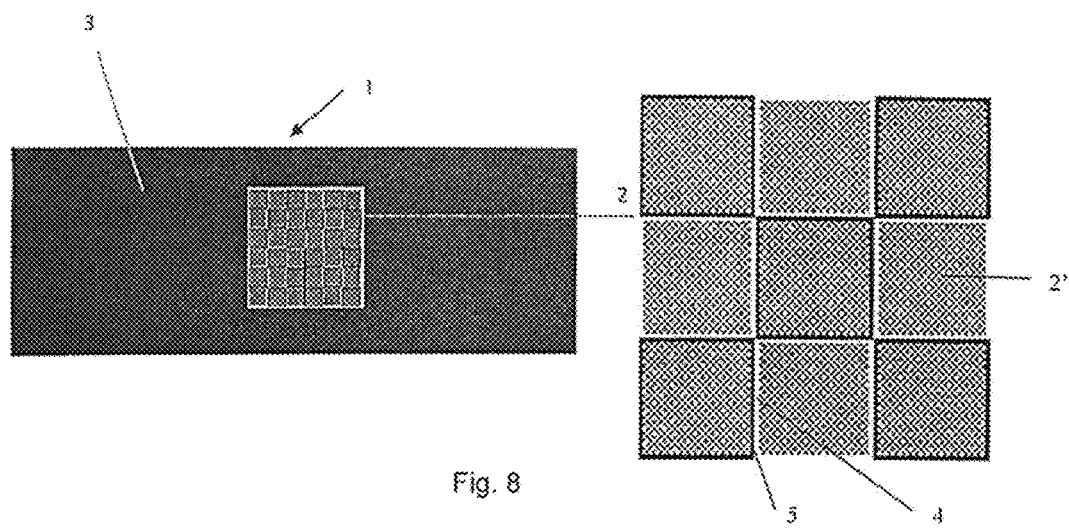
FIG. 8 shows a third exemplary configuration of a calibration plate according to an embodiment of the present invention.

Another calibration plate depicted in FIG. 8 can achieve a similar function to that in FIG. 7. Specifically, sub-surface structures 2' are further formed within each of the grid cells (hereinafter referred to as "large grid cells") of the calibration area 2 and also comprise a plurality of grid cells (hereinafter referred to as "small grid cells") periodically arranged in a chessboard-like pattern, wherein at least part of the boundary of each small grid cell of the sub-surface structure can also be identified by the optical imaging system of the digital microscope. Here it shall be noted that at the interface of any two adjacent large grid cells, only partial areas (which are indicated by black thick line 5 and white thick line 4 in FIG. 8) adjoining the interface of the respective large grid cells have different reflectivities. During measuring calibration, when the calculation might not be sufficiently accurate because the large grid cells appearing within the objective visual field are less than a predetermined number, the junction points among the small grid cells of the sub-surface structure within some large grid cells are used to calculate the magnification; or conversely, when the calculation load is too great because the small grid cells of the sub-surface structure appearing within the objective visual field are more than the predetermined number, the junction points among the large grid cells are used to calculate the magnification. It shall be pointed out that, in this configuration not all the large grid cells have to include a sub-surface structure, and it is also allowable that only one or more large grid cells include a sub-surface structure. In addition, it is envisaged that the small grid cells within a large grid cell may be divided into several equally sized groups, each group forming an "intermediate grid cell." The junction points or boundaries of the intermediate grid cells may be used for calculation according to the magnification of the objective lens to be calibrated in order to meet both the requirements of calculation accuracy and calculation time.

Figure 10:
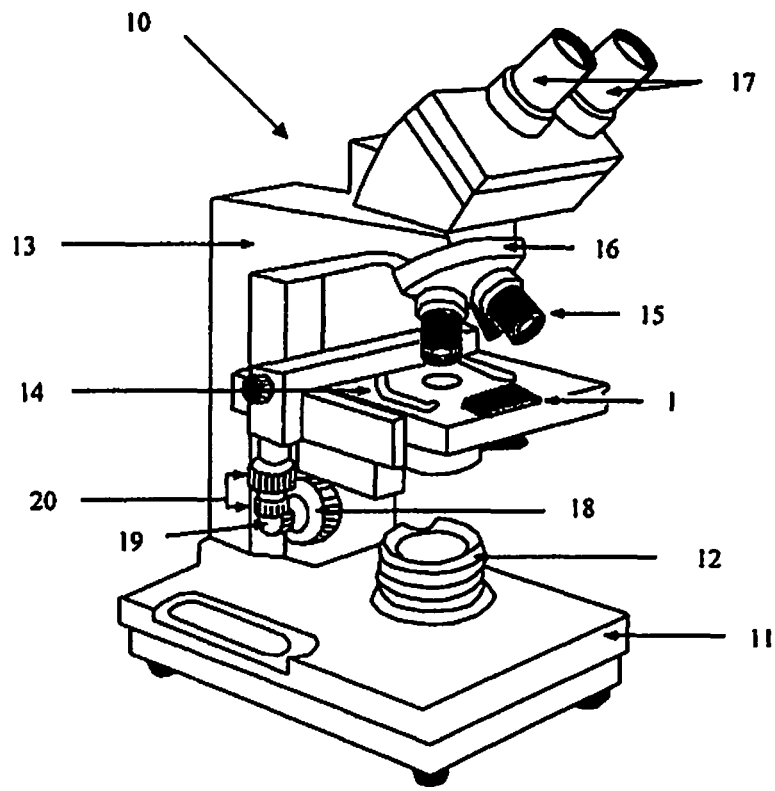
FIG. 10 shows an exemplary digital microscope equipped with a calibration plate according to an embodiment of the present invention.

The calibration plate according to the present invention can be integrated with the digital microscope to form a digital microscope system. Advantageously, as depicted in FIG. 10, the calibration plate 1 according to the present invention may be fixedly disposed within a digital microscope 10. As it is well known to those skilled in the art, the digital microscope 10 may include a base 11, a light source 12, an arm 13, a stage 14, an objective lens 15, a revolving nosepiece 16, an ocular/eyepiece 17, a coarse adjustment knob 18 and a fine adjustment knob 19, wherein the calibration plate 1 is mounted on the stage 14, e.g. on a lateral portion of the stage 14. In order to use the calibration plate 1, the stage 14 is designed to be movable, thereby it is capable of driving the calibration plate 1 to move together so as to position the calibration area thereof within the objective visual field of the digital microscope 10. Movement of the stage 14 can be performed by e.g. operating a stage manipulator knob 20. The above structure allows for easy use of the calibration plate 1 without removing the specimen from the stage 14 during use of the calibration plate 1. Of course, the calibration plate may also be provided separately from the digital microscope as an accessory thereof.

It will be apparent to those skilled in the art that various modifications and variations can be made to the embodiments disclosed herein without departing from the scope or spirit of the present invention. Other embodiments will be apparent to those skilled in the art from consideration of the specification and practice of the disclosed invention. It is intended that the specification and examples be considered as exemplary only, with a true scope being indicated by the following claims and their equivalents.

The invention claimed is:

1. A calibration plate for measuring calibration of a digital optical microscope within a single optical field of view of the microscope, the calibration plate comprising at least one calibration area formed with a surface structure which includes a plurality of grid cells arranged periodically, wherein at least part of a boundary or at least part of an apex of each grid cell can be identified by an optical imaging system of the digital optical microscope, wherein reflection rates at opposite sides of the at least part of the boundary of each grid cell that can be identified by the optical imaging system of the digital microscope are different from each other, wherein each whole grid cell has a different reflection rate from adjoining areas or adjoining grid cells, and wherein each grid cell and adjoining areas or adjoining grid cells have different surfaces formed with different reflection rates by photoetching.

2. The calibration plate according to claim 1, wherein the grid cells have equal size and identical shape.

3. The calibration plate according to claim 2, wherein each grid cell is in the shape of a square.

4. The calibration plate according to claim 3, wherein the plurality of grid cells are arranged in a chessboard-like pattern.

5. The calibration plate according to claim 1, wherein the plurality of grid cells are stripes arranged in one-dimensional direction.

6. The calibration plate according to claim 1, wherein the calibration plate includes a plurality of different calibration areas, and the grid cells in any one calibration area have different size from those in other calibration areas.

7. The calibration plate according to claim 1, wherein a sub-surface structure is formed in at least one grid cell of at least one calibration area and wherein the sub-surface structure also includes a plurality of grid cells arranged periodically, wherein at least part of a boundary or at least part of an apex of each grid cell of the sub-surface structure can be identified by the optical imaging system of the digital microscope.

8. The calibration plate according to claim 1, further including an even reflection area which exhibits equal reflection rate for visible lights of all the wavelengths.

9. The calibration plate according to claim 8, wherein the even reflection area is formed by a metallic coating or an optical reflective coating formed on a surface of the calibration plate.

* * * * *